United States Patent
Choi

(10) Patent No.: US 7,913,073 B2
(45) Date of Patent: Mar. 22, 2011

(54) SYSTEM EMBEDDING PLURAL CONTROLLER SHARING NONVOLATILE MEMORY

(75) Inventor: Sung-Up Choi, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 787 days.

(21) Appl. No.: 11/846,365

(22) Filed: Aug. 28, 2007

(65) Prior Publication Data

US 2008/0072031 A1 Mar. 20, 2008

(30) Foreign Application Priority Data

Sep. 19, 2006 (KR) .................. 10-2006-0090868

(51) Int. Cl.
 *G06F 15/177* (2006.01)
(52) U.S. Cl. .................................. 713/2; 713/1
(58) Field of Classification Search .................. 713/2
 See application file for complete search history.

(56) References Cited

U.S. PATENT DOCUMENTS

| | | | | |
|---|---|---|---|---|
| 5,410,707 A | * | 4/1995 | Bell | 713/2 |
| 6,654,832 B1 | * | 11/2003 | Meyer et al. | 710/100 |
| 6,948,057 B2 | * | 9/2005 | Lai et al. | 713/2 |
| 2004/0017708 A1 | | 1/2004 | Choi et al. | |
| 2006/0053246 A1 | * | 3/2006 | Lee | 711/100 |

FOREIGN PATENT DOCUMENTS

| | | |
|---|---|---|
| JP | 2002-278781 | 9/2002 |
| JP | 2004-062913 | 2/2004 |
| JP | 2005-010942 | 1/2005 |
| JP | 2005-071303 | 3/2005 |
| KR | 1020010081149 | 8/2001 |
| KR | 1020030074106 | 9/2003 |
| KR | 1020040011657 | 2/2004 |
| KR | 1020060031192 | 4/2006 |
| WO | WO 2006/026645 | 3/2006 |

OTHER PUBLICATIONS

English Abstract for Publication No. 1020010081149, Aug. 29, 2001.
English Abstract for Publication No. 1020040011657, Feb. 11, 2004.
English Abstract for Publication No. 2004-062913, Feb. 26, 2004.
English Abstract for Publication No. 2005-071303, Mar. 17, 2005.
English Abstract for Publication No. 1020030074106, Sep. 19, 2003.
English Abstract for Publication No. 2005-010942, Jan. 13, 2005.
English Abstract for Publication No. 1020060031192, Apr. 12, 2006.
English Abstract for Publication No. 2002-278781, Sep. 27, 2002.

* cited by examiner

*Primary Examiner* — Dennis M Butler
(74) *Attorney, Agent, or Firm* — F. Chau & Associates, LLC

(57) ABSTRACT

An embedded memory card system includes a CPU, a nonvolatile memory storing a booting code and data, a card slave controller controlling the nonvolatile memory, a card host controller communicating with the card slave controller, and a memory controller controlling a volatile memory. The CPU controls the memory controller to boot the system directly from booting code as it is read from the nonvolatile memory.

13 Claims, 2 Drawing Sheets

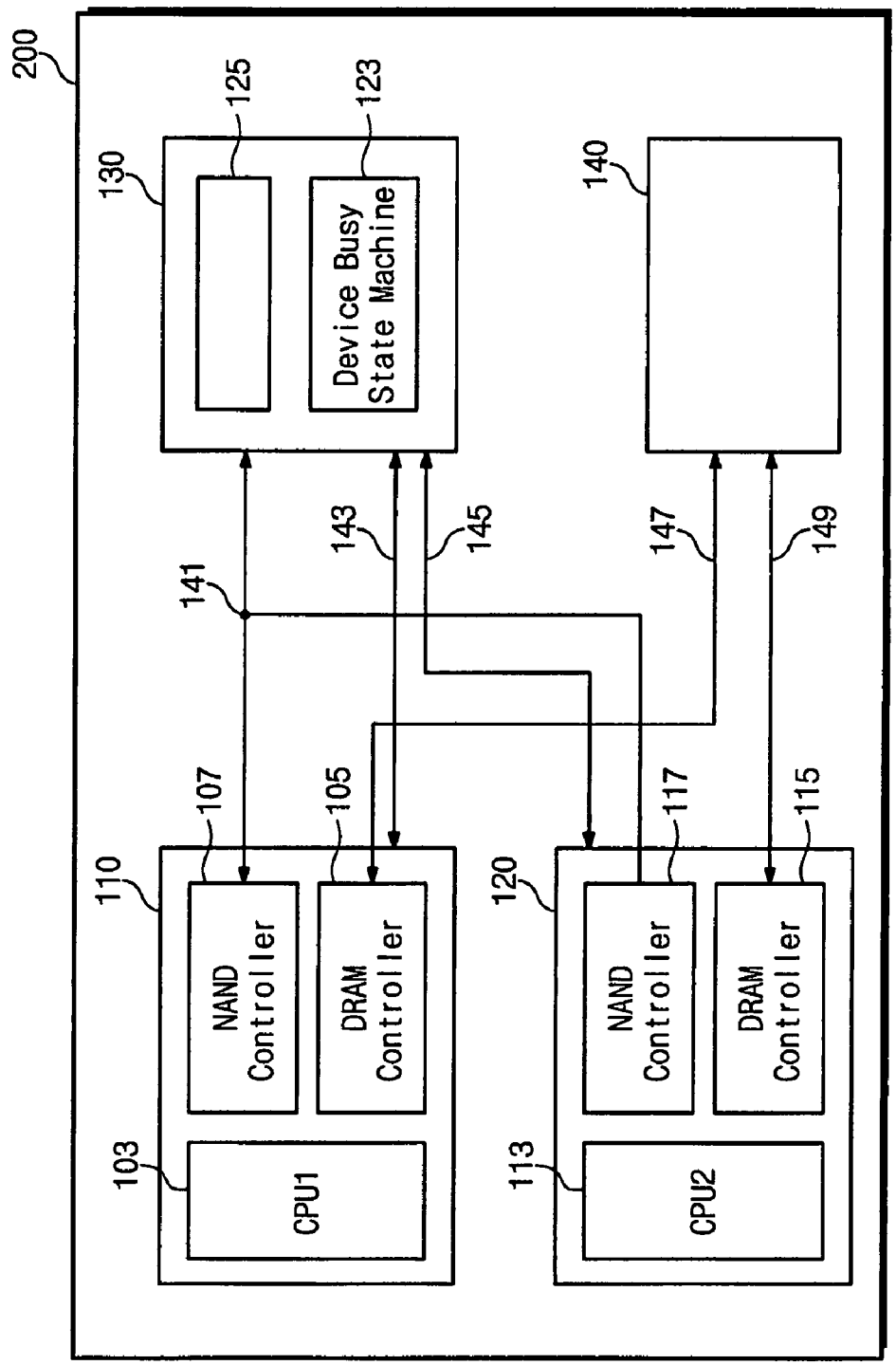

SYSTEM EMBEDDING PLURAL CONTROLLER SHARING NONVOLATILE MEMORY

CROSS-REFERENCE TO RELATED APPLICATIONS

This application claims priority under 35 U.S.C. §119 to Korean Patent Application No. 10-2006-90868, filed on Sep. 19, 2006, the entire contents of which are hereby incorporated by reference.

BACKGROUND OF THE INVENTION

1. Technical Field

The present invention relates to nonvolatile memory, and more particularly, to a system embedding plural controller sharing nonvolatile memory.

2. Discussion of the Related Art

High-capacity flash memory cards have been embedded in mobile devices. One example of an embedded flash memory card is called a moviNAND. The moviNAND is an embedded NAND flash memory using a multi-media card (MMC) interface protocol.

When the moviNAND is embedded in a system, a processor accesses the embedded flash memory using the MMC interface protocol.

SUMMARY OF THE INVENTION

Exemplary embodiments of the present invention provide a system that can be booted using a moviNAND.

Exemplary embodiments of the present invention also provide an apparatus capable of storing or accessing data using a nonvolatile memory in a dual core system.

Exemplary embodiments of the present invention provide systems including a CPU, a nonvolatile memory storing a booting code and data, a card slave controller controlling the nonvolatile memory, a card host controller communicating with the card slave controller, and a memory controller controlling an external memory. The memory controller directly accesses the nonvolatile memory to read the booting code under the control of the CPU in a boot operation.

In some exemplary embodiments, in a normal operation, the memory controller accesses the external memory under the control of the CPU, and the card host controller accesses the data of the nonvolatile memory through the card slave controller.

In some exemplary embodiments, the nonvolatile memory includes a NAND flash memory.

In some exemplary embodiments, the memory controller uses a NAND interface protocol.

In some exemplary embodiments, the card slave controller uses an MMC interface protocol.

In some exemplary embodiments of the present invention, systems include a CPU, a nonvolatile memory storing a booting code and data, a memory controller reading the booting code of the nonvolatile memory through a first access path under the control of the CPU, and an external memory accessed by the memory controller through a second access path under the control of the CPU.

In some exemplary embodiments, the first access path comprises a bus connected between the memory controller and the nonvolatile memory and a first transmission gate connected to the bus.

In some exemplary embodiments, the first transmission gate is activated by the CPU in a boot operation.

In some exemplary embodiments, the second access path comprises a bus connected between the memory controller and the external memory and a second transmission gate connected to the bus.

In some exemplary embodiments, the second transmission gate is activated by the CPU in a normal operation.

In some exemplary embodiments, the system further includes a card host controller accessing the nonvolatile memory through a card slave controller.

In some exemplary embodiments of the present invention, systems include a first CPU, a second CPU, a nonvolatile memory storing data, and a device busy state machine selecting one of the first CPU and the second CPU to access the nonvolatile memory. The nonvolatile memory is accessed by the one of the first CPU and the second CPU selected by the device busy state machine.

In some exemplary embodiments, the device busy state machine supports a dual core CPU having the first and second cores using a round-robin method.

In some exemplary embodiments, the device busy state machine supports a dual core CPU having the first and second cores using a master-slave method.

In some exemplary embodiments, the nonvolatile memory includes a NAND flash memory.

BRIEF DESCRIPTION OF THE DRAWINGS

These and/or other aspects and features of the exemplary embodiments of the present inventive concept will become apparent and more readily appreciated from the following description of the exemplary embodiments, taken in conjunction with the accompanying drawings of which:

FIG. 2 is a block diagram of a system for accessing one nonvolatile memory in a system embedding a dual core CPU according to an exemplary embodiment of the present invention.

DETAILED DESCRIPTION OF EXEMPLARY EMBODIMENTS

Figure 1:
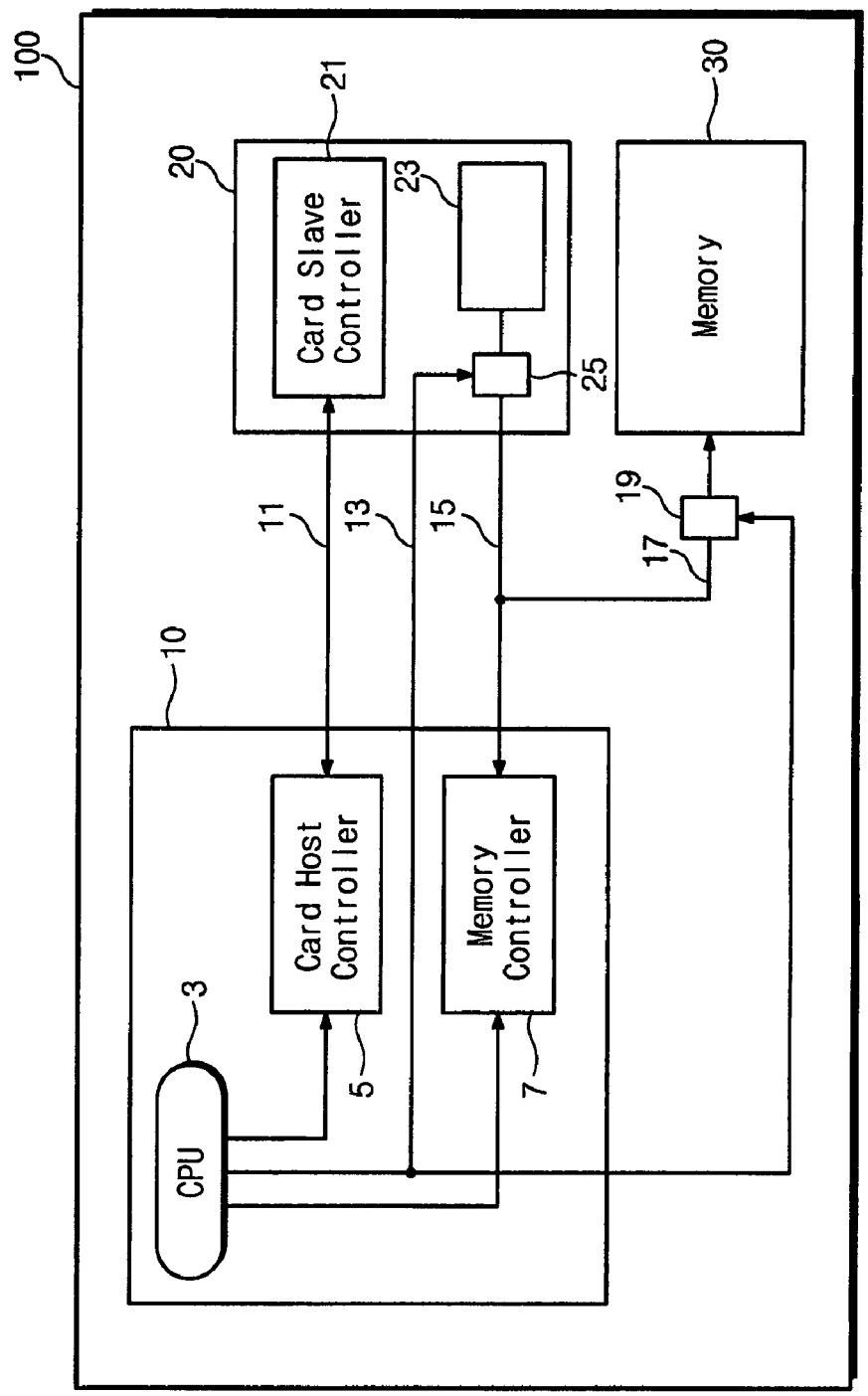
FIG. 1 is a block diagram of a system embedding a moviNAND according to an exemplary embodiment of the present invention.

Reference will now be made to exemplary embodiments of the present invention in conjunction with the accompanying drawings.

FIG. 1 is a block diagram of a system 100 embedding a moviNAND according to an exemplary embodiment of the present invention. Referring to FIG. 1, the system 100 includes a CPU core 10, a moviNAND 20, and a memory 30.

The CPU core 10 performs a processing operation in the system 100. The CPU core 10 includes a CPU 3, a card host controller 5, and a memory controller 7. The CPU 3 is a central processing unit. The card host controller 5 interfaces with the moviNAND 20, and the memory controller 7 interfaces with the memory 30.

The moviNAND 20 includes an embedded NAND flash memory that uses an MMC interface protocol. The moviNAND 20 includes a card slave controller 21, a NAND flash memory 23, and a transmission gate 25. The card slave controller 21 interfaces with the card host controller 5. The NAND flash memory 23 is a nonvolatile memory. The transmission gate 25 connects or disconnects a bus 15 under the control of the CPU 3. The memory 30 may include a dynamic random access memory (DRAM), a static random access memory (SRAM), or the like.

Exemplary embodiments of the present invention further include a bus capable of directly accessing a flash memory in a moviNAND and a control signal controlling it.

For example, the memory controller 7 accesses the nonvolatile NAND flash memory 23 through the bus 15. The memory controller 7 accesses the memory 30 through a bus 17.

In a boot operation of the system 100, the NAND flash memory 23 is connected with the memory controller 7 through the transmission gate 25 under the control of the CPU 3. When the system 100 operates normally, the memory 30 is connected with the memory controller 7 through a transmission gate 19 under the control of the CPU 3. The system 100 accesses the moviNAND 20 through a bus 11.

Therefore, when the moviNAND 20 is embedded in the system 100, the CPU 3 directly accesses the NAND flash memory 23 in the moviNAND 20 to read booting or program code, thereby booting the system 100.

FIG. 2 is a block diagram of a system for accessing nonvolatile memory in a system having a dual core CPU. Conflict between two CPU cores accessing one memory can be prevented, even in the case where a dual core CPU is embedded in the system.

Referring to FIG. 2, a system 200 includes a first CPU core 110, a second CPU core 120, a storage device 130, and a memory 140. The first CPU core 110 includes a CPU 103, a DRAM controller 105, and a NAND controller 107. The second CPU core 110 includes a CPU 113, a DRAM controller 115, and a NAND controller 117. The CPUs 103 and 113 are central processing units. The DRAM controllers 105 and 115 control a DRAM outside the first and second CPU cores 110 and 120. The NAND controllers 107 and 117 control a nonvolatile memory 125 in the storage device 130.

The storage device 130 includes a device busy state machine 123 and the nonvolatile memory 125. The device busy state machine 123 controls the first and second CPU cores 110 and 120 using an interrupt signal for using a bus 141. The nonvolatile memory 125 stores a booting code for booting the system 200 and data.

The memory 140 includes a DRAM having a dual port. In the system 200 including the dual core CPU, when one of the first and second CPUs 103 and 113 accesses the one nonvolatile memory 125, the nonvolatile memory 125 is accessed by one of the first and second CPUs 103 and 113 under the control of the device busy state machine 123.

One of the first and second CPUs 103 and 113 may be selected using a round-robin method of supporting the first and second CPUs 103 and 113 in sequential order. Alternatively, a master-slave method may be used, in which the first CPU 103 operates as a master and the second CPU 113 operates as a slave provided that the first and second CPUs 103 and 113 are selected as a main processor and a co-processor, respectively.

In the system 200, when the first CPU 103 is to access the nonvolatile memory 125, the first CPU 103 requests that the device busy machine 123 access the nonvolatile memory 125. The device busy state machine 123 controls the first CPU 103 to access the nonvolatile memory 125 in response to the request of the first CPU 103.

When the first and second CPUs 103 and 113 are to access the nonvolatile memory 125 simultaneously, the device busy state machine 123, employing a round-robin method, sequentially responds to the requests of the first and second CPUs 103 and 113.

When the device busy state machine 123 controls the first and second CPUs 103 and 113 using a master-slave method (assuming that the first CPU 103 is a man processor) the device busy state machine 123 controls the first CPU 103 to access the nonvolatile memory 125 prior to the second CPU 113 in response to the requests of the first and second CPUs 103 and 113.

In a system embedding a flash memory using an MMC interface protocol, the system is not booted using the MMC interface protocol. Therefore, exemplary embodiments of the present invention provide a booting system using a flash memory in a system including an embedded flash memory by adding an access path for directly accessing a flash memory.

Exemplary embodiments of the present invention provide a system preventing conflict between two processors when the two processors access one nonvolatile memory simultaneously, even in the case where data are stored and accessed using the one nonvolatile memory in a dual core system.

According to exemplary embodiments of the present invention, a system can be booted using a moviNAND.

Also, data can be stored or accessed using one nonvolatile memory in a dual core system.

While exemplary embodiments of the present invention have been particularly shown and described with reference to the drawings, it will be understood by those of ordinary skill in the art that various changes in form and details may be made without departing from the spirit and scope of the present invention.

What is claimed is:

1. An embedded memory card system, comprising:
a central processing unit (CPU);
a nonvolatile memory storing a booting code and data;
a card slave controller controlling the nonvolatile memory;
a card host controller communicating with the card slave controller; and
a memory controller controlling a volatile memory and accessing the nonvolatile memory through a bus,
wherein the CPU controls the memory controller to boot the system directly from booting code as it is read from the nonvolatile memory, and
wherein the bus, along with a transmission gate connected to the bus, forms an access path, and the transmission gate is activated by the CPU in a boot operation.

2. The system of claim 1, wherein, in a normal operation, the memory controller accesses the volatile memory under control of the CPU, and the card host controller accesses the data of the nonvolatile memory through the card slave controller.

3. The system of claim 1, wherein the nonvolatile memory comprises a flash memory.

4. The system of claim 1, wherein the nonvolatile memory comprises a NAND flash memory.

5. The system of claim 1, wherein the memory controller uses a NAND interface protocol.

6. The system of claim 1, wherein the card slave controller uses a multi-media card (MMC) interface protocol.

7. The system of claim 1, wherein the CPU, the nonvolatile memory, the card slave controller, the card host controller, the memory controller, and the volatile memory are embedded to the memory card.

8. An embedded memory card system, comprising:
a CPU;
a nonvolatile memory storing a booting code and data;
a memory controller reading the booting code of the nonvolatile memory through a first access path under control of the CPU; and
a volatile memory accessed by the memory controller through a second access path under control of the CPU,
wherein the first access path comprises a bus connected between the memory controller and the nonvolatile memory and a first transmission gate connected to the bus, and the first transmission gate is activated by the CPU in a boot operation.

9. The system of claim 8, wherein the second access path comprises a bus connected between the memory controller and the volatile memory and a second transmission gate connected to the bus.

10. The system of claim 9, wherein the second transmission gate is activated by the CPU in a normal operation.

11. The system of claim 8, further comprising a card host controller accessing the nonvolatile memory through a card slave controller.

12. A portable electronic device comprising an embedded memory card system, the embedded memory card system comprising:

a central processing unit (CPU);

a nonvolatile memory storing a booting code and data;

a card slave controller controlling the nonvolatile memory;

a card host controller communicating with the card slave controller; and a memory controller controlling a volatile memory and accessing the nonvolatile memory through a bus, wherein the CPU controls the memory controller to boot the system directly from booting code as it is read from the nonvolatile memory, and wherein the bus, along with a transmission gate connected to the bus, forms an access path, and the transmission gate is activated by the CPU in a boot operation.

13. The portable electronic device of claim 12, wherein the portable electronic device is a personal digital assistant (PDA).

* * * * *